US006275849B1

(12) United States Patent
Ludwig

(10) Patent No.: US 6,275,849 B1
(45) Date of Patent: Aug. 14, 2001

(54) COMMUNICATION SYSTEM FOR ELECTRONIC MESSAGES

(75) Inventor: Reiner Ludwig, Kensington, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/071,041

(22) Filed: May 4, 1998

(30) Foreign Application Priority Data

May 2, 1997 (DE) ............................................. 197 18 654

(51) Int. Cl.[7] ..................................................... G06F 15/16
(52) U.S. Cl. ......................... 709/206; 709/201; 707/104; 707/501
(58) Field of Search ................................. 707/104, 103, 707/501, 513; 709/207, 206, 213, 201; 711/202–209

(56) References Cited

U.S. PATENT DOCUMENTS

| 5,111,390 | * | 5/1992 | Ketcham ............................ 395/705 |
| 5,148,292 | | 9/1992 | Kutaragi . |
| 5,418,908 | * | 5/1995 | Keller et al. ....................... 709/206 |
| 5,617,541 | * | 4/1997 | Albanese et al. ................... 709/207 |
| 5,630,060 | * | 5/1997 | Tang et al. ........................ 709/206 |
| 5,708,845 | * | 1/1998 | Wistendahl et al. ................ 345/302 |
| 5,724,575 | * | 3/1998 | Hoover et al. ...................... 707/10 |
| 5,751,883 | * | 5/1998 | Ottesen et al. ..................... 386/27 |
| 5,781,186 | * | 7/1998 | Jennings ............................ 709/206 |
| 5,848,137 | * | 12/1998 | Hsiao ............................ 379/110.01 |
| 5,903,734 | * | 5/1999 | Chida .............................. 709/232 |
| 5,933,835 | * | 8/1999 | Adams et al. ..................... 707/104 |
| 5,941,953 | * | 8/1999 | Bergmann et al. ................. 707/104 |
| 5,999,985 | * | 12/1999 | Sebestyen ......................... 709/247 |
| 6,035,304 | * | 3/2000 | Machida et al. ................... 707/104 |
| 6,175,573 | * | 1/2001 | Togo et al. ........................ 370/474 |

FOREIGN PATENT DOCUMENTS

| 0 654 734 A1 | 5/1995 | (EP) . |
| WO 92 22033 | 12/1992 | (WO) . |

OTHER PUBLICATIONS

Thimm H. et al., "A Mail–Based Teleservice Architecture for Archiving and Retrieving Dynamically Composable Multimedia Documents", MultiMedia Transport and Teleservices, International cost 237 works proceedings, Vienna, Nov. 13, 1994, pp. 14–34.*

(List continued on next page.)

Primary Examiner—Dung C. Dinh
Assistant Examiner—Bradley Edelman
(74) Attorney, Agent, or Firm—Burns, Doane, Swecker & Mathis, L.L.P.

(57) ABSTRACT

A communication system for transmitting electronic messages is disclosed. The communication system includes a plurality of data processing devices and a data network for transmission of the electronic messages. The electronic messages include an assignment data block, in addition to text data, image data, audio data and the like. The assignment block includes specific assignments between particular data segments or blocks of the electronic message, such as image, text and/or audio, such that interrelation between particular segments/blocks of the data can be transmitted in a simple manner and be used for subsequent display or reproduction of the message.

10 Claims, 3 Drawing Sheets

OTHER PUBLICATIONS

IBM, "Synchronous Data Link Control (SDLC)", IBM Publications, 1986, pp. 21–27.*

Teunissen B. et al., "MultiMedia Mail: A Colourful Business Application for Success", Information networks and data communication, proceedings of the IFIP TC6 International conference on Information Networks and Dada Communication, Funchal, Madiera Island, 1994.*

Thimm H. et al., "A Mail–Based Teleservice Architecture for Archiving and Retrieving Dynamically Composable Multimedia Documents", MultiMedia Transport and Teleservices, International cost 237 works proceedings, Vienna, Nov. 13–15, 1994, Nov. 1994, Date of Publication: Nov. 13, 1994; pp. 14–34.

Teunissen B. et al., "MultiMedia Mail: A Colourful Business Application for Success", Information networks and data communication, proceedings of the IFIP TC6 International conference on Information Networks and Data Communication, Funchal, Madeira Island, Portugal, Apr. 18–21, 1994, Date of Publication: Apr. 18, 1994; pp. 45–56.

International Business Machines "*Synchronous Data Link Control (SDLC)*", IBM Publications, 1986, pp. 21–27.

PCT International Search Report Appln. No. PCT/EP98/02570 Date of Completion: Oct. 5, 1998 Date of Mailing: Oct. 12, 1998.

* cited by examiner

COMMUNICATION SYSTEM FOR ELECTRONIC MESSAGES

BACKGROUND

The present invention relates to a communication system for electronic messages and in particular relates to a communication system for transmitting electronic messages and electronic mail, respectively, between data processing devices, connected to each other via a communication network.

The importance of transmitting messages by using electronic means is steadily growing. Particularly with the introduction of personal computers, the exchange of information using computer aided systems is not limited any longer to a relatively small group having access to networks of computers, e.g., in research and development facilities, but is accessible by broader parts of the population.

In a system for exchanging information with a plurality of computers, interconnected by a network, electronic messages (electronic mail) can be transmitted via the network from any one computer to any other computer. It is, however, required that all computers that are part of the data communication or transmission of an electronic message agree upon a uniform method and data format for exchanging message data, as for example the address of the recipient or for specifying the partition of the electronic mail containing the actual message, only if the same method is applied for generating an electronic message, as well as for analyzing an electronic message, is a meaningful interpretation of data transmitted from one computer to one or more other computers possible.

In this connection, methods for communication and communications protocols for the exchange of electronic messages between computers via a computer network were developed. These methods enable the user of a first computer to generate a message containing, e.g., plain text and, after specifying a recipients address, to transmit the message as an electronic message to a second computer. The second computer receives the electronic message and stores it or reproduces it, respectively. It is also possible to store the message at a suitable location in the network and to actively retrieve it later using a computer.

Some of these methods are widely used and accepted. Most importantly, with the introduction of the Internet, a world wide network of computers, methods and standards have been developed for transmitting mostly text as an electronic message or electronic mail, a so called email. The MIME "Multi-Purpose Internet Mail Extensions" Standard by Borenstein and N. Freed (RFC 1521, September 1993) defines one of these methods for exchanging electronic messages between data processing devices. This standard is widely used for Internet applications.

A message exchanged between computers according to one of these methods, e.g. according to the MIME standard, may have the following structure: A first partition of the data set to be transmitted contains information concerning the method which was employed for creating the electronic message, in order to enable the receiving data processing device to choose a suitable program for interpreting or analyzing the received electronic message. In a second partition of the data set which is to be transmitted, the type of the message or a format of the data of the actual message is specified. For example, data constituting a message may be coded or may be transformed in a particular manner, and thus the second data field enables the receiving data processing device to suitably retransform the message in order to meaningfully represent it. In a third partition of the data set constituting the electronic message, the actual message is contained in the format described in the second partition of the data set.

The transmission of an electronic message according to this method could happen in the following way: In a first step, e.g. using a data processing device, a piece of electronic text is created, which is to be transmitted to a recipient. The mailer may be advised by a processing command to provide the necessary information for creating the electronic mail "email". For example, the address of the recipient, an Internet address, would be requested as an integral part of the electronic message. In addition, further information can optionally be provided, e.g. distribution, coding and the like. In a second step, the mailer instructs the data processing device to mail the electronic message over the network. Subsequently the message is delivered to a receiving data processing device, specified by the address. If a recipient desires to view received mail, he activates a program at a data processing device, which displays the received electronic message in accordance with the data partitions described above. Various further functions, such as replying, forwarding and storing of the electronic message, are possible.

Some methods for exchanging electronic messages between data processing devices do not only enable the transmission of text as an electronic message but also enable the transmission of other media. For example, the above mentioned MIME standard allows to transmit, besides text information, image data, audio data, video data and data regarding certain applications and application programs, respectively. Thus a partition of the data of the electronic message could be reserved for text data, another partition for image data, and similarly further partitions for video, audio and the like.

FIG. 5 shows an example of the structure of an electronic message B, that could be displayed on a display (not shown) by a receiving data processing device D. A data segment B1 contains address information, e.g., specifying the Internet address of the sending station and the Internet address of the recipient. A data segment B2 of the email displays a text block containing a written message, a segment B3 displays an image, a segment B4 of the display contains information indicating video data, which can be played back following a selection using a selection device, e.g. a cursor and by clicking a mouse button. Similarly section B5 contains information indicating audio data, which can be played back using the selection means of the data processing device.

In the communication system with the above described method, an electronic message is interpreted by the receiving data processing device and data segments of particular data blocks or media are displayed on the display, played back, stored and the like. However, it is possible, that certain relations between the data sections B1 to B5 were of importance while creating the message. For example, an electronic message could contain a text block, wherein specific passages of the text block in content relate to another specific passage, a picture or the like.

In the above described communication system, it is a disadvantage, that there is no easy way of including those relations into the electronic message for transmitting it to a recipient.

SUMMARY

It is therefore an object of the present invention to provide an improved communication system, allowing transmission of an electronic message having a plurality of mutually associated contents.

The object of the invention is solved by a communication system for electronic messages, comprising: a plurality of data processing devices (DV1–DVn) each having central processing means (ZV1–ZVn), storage means (S1–Sn), input means (EV1–EVn) and display means (AV1–AVn); a data network (N) for a data transmission of electronic messages (E), controlled by the central processing means (ZV1–ZVn) of a first data processing device (DV1–DVn), to a second data processing device (DV–DVn); wherein the electronic message includes data blocks (TB1, TB2, Al); the central processing means of the second data processing device analyze the received message and store the data blocks included in the electronic message in the storage means and display or reproduce the data blocks, controlled by the input means; and an assignment data block (Z) is additionally transmitted with the transmission of an electronic message (E), including at least one assignment instruction specifying an assignment between a first data block or data segment and at least one second data block or data segment of the electronic message.

The object of the invention is also solved by a communication system for electronic messages, further wherein an assignment data block (Z) is additionally transmitted with the transmission of an electronic message (E), including at least one assignment instruction specifying an assignment between a first data block or data segment and at least one second data block or data segment of the electronic message; and the assignment data block (Z) comprises an assignment between a data segment or data block and an application program.

The object of the invention is further solved by a communication system for electronic messages, comprising: a plurality of data processing devices (DV1–DVn) each having central processing means (ZV1–ZVn), storage means (S1–Sn), input means (EV1–EVn) and display means (AV1–AVn); a data network (N) for a data transmission of electronic messages (E), controlled by the central processing means (ZV1–ZVn) of a first data processing device (DV1–DVn), to a second data processing device (DV1–DVn); wherein the electronic message includes at least one of the group consisting of: at least one text data block (TB1, TB2); at least one image data block (TB1, TB2); and at least one audio data block (A1); the central processing means of the second data processing device analyze the received message and store the data blocks included in the electronic message in the storage means and display or reproduce the data blocks, controlled by the input means; an assignment data block (Z) is additionally transmitted with the transmission of an electronic message (E), including at least one assignment instruction specifying an assignment between a first data block or data segment and at least one second data block or data segment of the electronic message; and the central processing means (ZV1–ZVn) are arranged to mark data segments or data blocks displayed on the respective display means which are linked with other data segments or data blocks.

Moreover, the object of the invention is solved by a communication system for electronic messages, comprising: a plurality of data processing devices (DV1–DVn) each having central processing means (ZV1–ZVn), storage means (S1–Sn), input means (EV1–EVn) and display means (AV1–AVn); a data network (N) for a data transmission of electronic messages (E), controlled by the central processing means (ZV1–ZVn) of a first data processing device (DV1–DVn), to a second data processing device (DV1–DVn); wherein the electronic message includes at least one of the group consisting of: at least one text data block (TB1, TB2); at least one image data block (TB1, TB2); and at least one audio data block (A1); the central processing means of the second data processing device analyze the received message and store the data blocks included in the electronic message in the storage means and display or reproduce the data blocks, controlled by the input means; an assignment data block (Z) is additionally transmitted with the transmission of an electronic message (E), including at least one assignment instruction specifying an assignment between a first data block or data segment and at least one second data block or data segment of the electronic message; the electronic message includes at least one of the group consisting of: at least one text data block (TB1, TB2); at least one image data block (TB1, TB2); and at least one audio data block (A1); and the central processing means (ZV1–ZVn) are arranged to mark audio data segments or audio data blocks, reproduced by respective play back means, which are linked with other data segments or data blocks by means of an audible signal.

One example of an advantage of the communication system according to the invention is the capability to optically mark such data segments of data blocks, displayed on display means of data processing means, which are linked to other data segments of data blocks by an assignment. Further, audio data segments connected with a data segment of a data block can, while being played back by audio means, be marked by an audio signal or a change of the pitch or similar. By selecting a correspondingly marked section, controlled by the input means of the respective data processing means, and using the assignment list generated from the assignments, corresponding data blocks can be displayed on said display means or can be reproduced otherwise.

Further embodiments of the invention can be found in the following detailed description.

BRIEF DESCRIPTION OF THE DRAWINGS

The present invention will now be described with reference to the following figures, in which.

DETAILED DESCRIPTION

Figure 1:
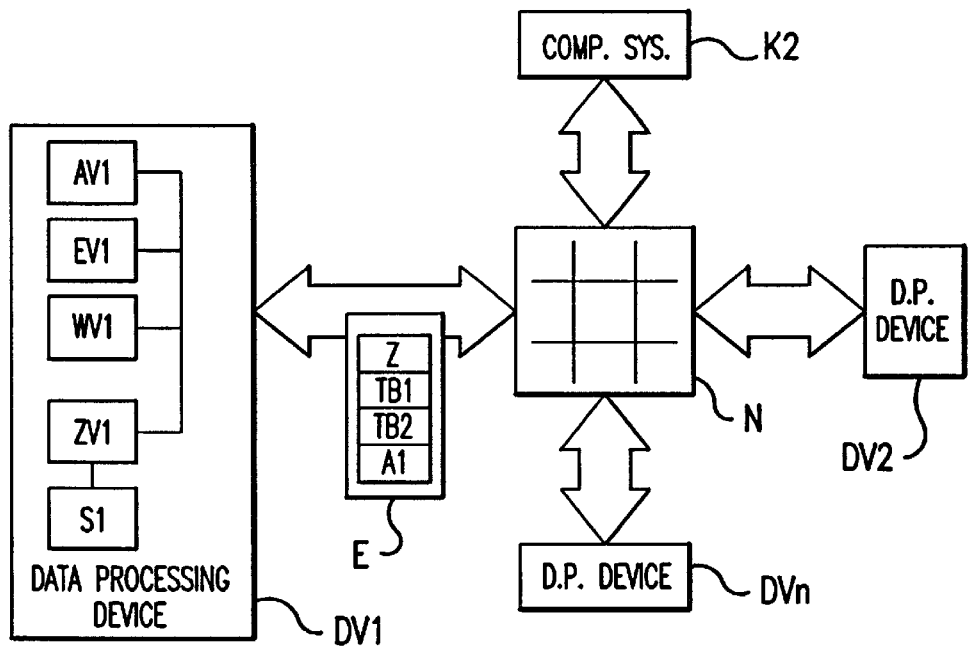
FIG. 1 illustrates a block diagram of a general arrangement of a communication system according to an embodiment of the invention.
Figure 5:
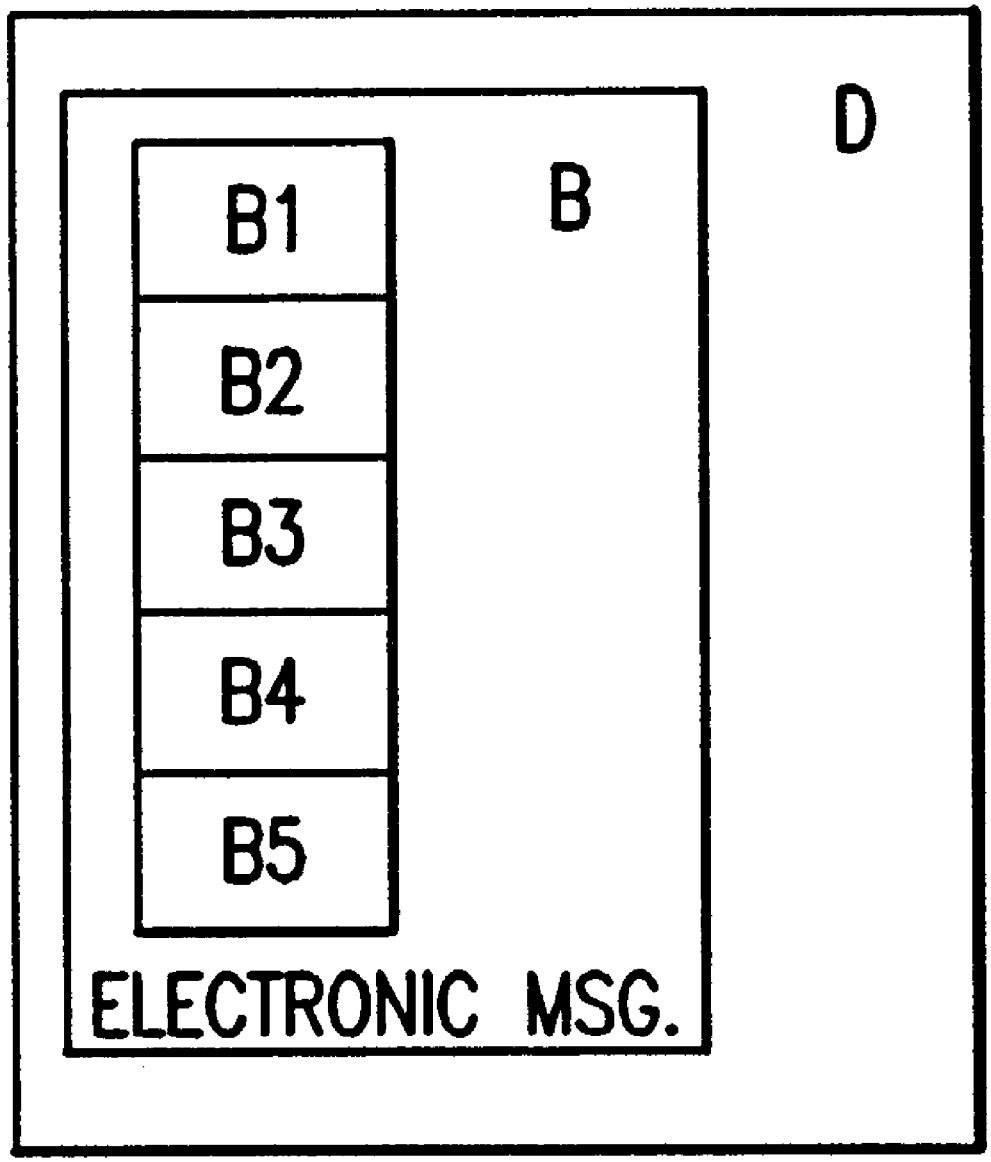
FIG. 5 shows a conventional example of data partitions of an respect to an embodiment illustrated in FIGS. 1 to 4.

FIG. 1 shows an embodiment of the communication system according to the invention. A plurality of data processing devices DV1, DV2, . . . , DVn are schematically shown and are interconnected via a network N. The connections, marked by double arrows, can be communication connections of any type, e.g., via an Internet, telephone lines and the like. The network is arranged such that data can be transferred from any first data processing device to any second data processing device. A data transmission is performed, as already outlined with respect to the prior art in FIG. 5, by sending an electronic message from a sending data processing device and by transmitting the message via the network to the designated receiving data processing device.

A data processing device of this embodiment of the communication network according to the invention in FIG. 1 comprises a data processing device, as for example the data processing device DV1, a central processing unit ZV1, a storage unit S1, input means EV1, display means AV1 and play back means WV1. In further embodiments, the data processing device can be arranged differently, e.g., it is not necessary to provide play back means, in case a play back of audio data is not desired.

As shown in FIG. 1 during the transmission of an electronic message E, text data blocks or image data blocks TB1 and TB2, an audio data block A1 as well as an assignment data block Z are transmitted. In further embodiments different arrangements of text- and/or image- and/or audio data blocks can be transmitted. A text data block can comprise written text of arbitrary length, if necessary partitioned in text data segments. An image data block can comprise a single image, if necessary with a plurality of image data segments, or can comprise a plurality of images (video). The audio data block A1 comprises at least one audio data segment, which can be played back by said play back means.

A message can be comprised of text data blocks, image data blocks, audio data blocks and of further data blocks of different content. The assignment data block Z, comprised in the electronic message E according to the invention, includes at least one assignment instruction specifying an assignment between a first data block or data segment and an at least one second data block or data segment of the electronic message. Thus the assignment data block can specify, e.g., instructions for an assignment between data segments of a text data block and data of another text data block, of an image data block or audio data block. In the same way, an image data block of an image or of an image sequence, an audio data block or segments of said blocks can be connected with further segments of the same data block or with segments of another block.

Thus, according to the invention, data segments of a data block can generally be assigned to data segments of the same data block or data segments of another data block. Also, a plurality of such assignments between at least two data blocks and/or data segments can be defined.

Further, data blocks, not shown in the figure, can be transmitted, which include an application program comprising instructions causing the central processing means ZV1 of the data processing device DV1 to perform certain functions. The assignment data block can include assignment instructions for said application programs and other data segments or data blocks.

Furthermore the assignment data block can contain assignment instructions connecting a data block or data segment with an application program stored in the storage means of the particular data processing device.

Upon reception of the electronic message from the network, e.g., at the data processing device DV1, the data of the received message is parsed into corresponding data blocks by the central processing unit ZV1 of the data processing device DV1 using indicator data sequences and controlled by an application program, and the data blocks are stored in the storage means S1. The central processing means ZV1 also performs an analysis of the assignment data block and generates a list of assignments between storage partitions of the storage means S1, where the particular data segments of the data blocks of the electronic message are stored. The generated list thus comprises an exact assignment between specific memory sections of the storage means S1, which correspond to the original assignments of the electronic message E. However, this is only meant as an example. In other embodiments the assignment data block can be processed differently.

The electronic message E, transmitted between data processing devices in the communication system according to the invention, can be composed such that data transmission and data formats, respectively, can be partially based on a known system or standard for transmitting electronic mail/messages in known networks of data processing devices. This establishes a downward compatibility with known communication systems and allows for data of an electronic message E, with the exception of the assignment data block Z, being processed by data processing devices processing electronic mail using known methods. Said known communication methods can, e.g., be the previously mentioned MIME (multipurpose Internet mail extensions) Standard, defining rules for a transmission of electronic mail together with the SMTP (simple mail transfer protocol) protocol. Another known communication method is the X.420 standard, controlling transmission of electronic mail together with the X.419 transmission protocol. Thus, in the communication system according to the invention shown with respect to FIG. 1, electronic messages can have a format, such that computers of known communication systems, designated with K2 in FIG. 1, working with known methods, can be recipients of an electronic message E delivered from the communication system according to the invention. The receiving computer of the communication system working with the known method is enabled to interpret the electronic message in a conventional manner, however, with the exception of the assignment data block.

On the other hand, the communication system according to the invention accordingly allows that electronic messages generated according to known methods, e.g., according to the MIME standard, can be received and analyzed by a data processing device according to the invention, providing an upward compatibility.

Thus electronic messages can be exchanged without problems from incompatibilities between communication system according to the invention and other communication systems.

Figure 2:
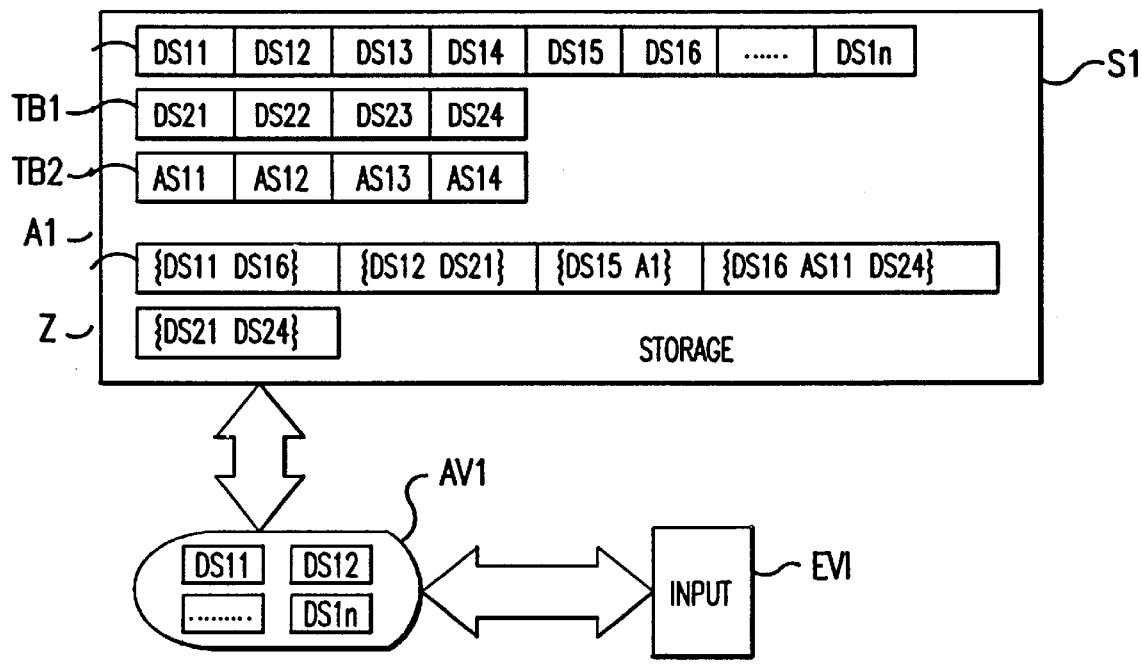
FIG. 2 illustrates an arrangement in a storage means of received and analyzed data of an electronic message.

FIG. 2 schematically illustrates an embodiment for storing data of an electronic message E in the storage means Sl, received by a data processing device DV1. FIG. 2 illustrates said storage means S1 and input means EV1, connected with display means AV1 (marked by a double arrow). Not shown in the figure are further means of the receiving data processing device, e.g., central processing means.

As already mentioned in connection with the embodiment described with respect to FIG. 1, electronic mail received by a data processing device is parsed into respective data blocks by the central processing means ZV1, not shown in the figure, controlled by a program and using indicator data sequences, and the data blocks are stored in said storage means 51. Indicator data sequences are needed to enable parsing the data stream of a received electronic message into specific data blocks. An indicator data sequence, for example, can be a sequence of particular high or low bits, whereby it is assured that the particular sequence of high or low bits does not occur randomly, i.e., within one of the data blocks or at another location. The occurrence of an indicator data sequence in the data stream of the received electronic message can thus be used to inform said central processing means ZV1 of a begin and an end of a respective data block of the electronic message. The analysis of the received electronic message is preferably performed by the central processing means under control of operating commands, i.e., of a program.

The received electronic message, parsed into respective data blocks, can be stored in said storage means S1, e.g., as it is schematically displayed in FIG. 2. It is understood that this is by way of an example and different manners of storing the data are possible.

The example for storing data in said storage means S1 shown in FIG. 2 illustrates a first text/image data block TB1 (a text data block or an image data block), comprised of a number of data segments DS11, DS12, . . . DS1n. Further, FIG. 2 illustrates a second text/image data block TB1, comprised of a number of data segments DS21, DS22, DS23, DS24. An audio data block A1 includes audio data segments AS11, AS12, AS13 and AS14. As mentioned, other embodiments may comprise different numbers of data segments or data blocks and other data blocks, for example related to application programs.

Also illustrated in FIG. 2 is the assignment data block Z, comprised in the electronic message according to the invention. As outlined before, the assignment data block can generally include assignments between data blocks and data segments, being in the example of FIG. 2 the above mentioned data blocks TB1, TB2 and A1 with their respective data segments. In this embodiment, the following examples of assignments are specified. Data segment DS16 is linked to data segment DS11, data segment DS21 is linked to data segment DS12, data segment AS11 and data segment DS24 are linked to data segment DS16. It is understood, that arbitrary assignments are possible, the assignments shown in FIG. 2 are only an explanatory example. The assignment {DS11, DS16} links one data segment of the data block TB1 to another data segment of the same data block. The assignment {DS12, DS21} links a data segment of the second data block TB2 to a data segment of the first data block TB1. Further the assignment of a whole data block to a data segment is possible, as for example illustrated by the assignment {DS11 TB2}. This third assignment links said audio data block A1 to the data segment DS15 of the data block TB1. The assignment {DS16 AS11 DS24} links data segment DS24 and additionally data segment AS11 to data segment DS16 and the assignment instruction {DS21 DS24} links data segment DS21 and data segment DS24 of the same data block TB2, in addition to the previously defined assignment between DS12 and DS21.

In general, any assignment between data of a first data block and data of any text data block and/or data of an audio data block and/or of an image data block and/or of an application program can be defined. Either data segments or entire data blocks can be assigned to each other. Further, sequences of assignments can be defined, e.g., a data segment of a first data block could be linked via an assignment with a data segment of a second data block, the data segment of a second data block could be linked with a data segment of a third data block, and so forth. Further, a data segment of a data block is linked with a plurality of other data segments of the same or another data block. For example, a data block constituting a partition of a sequence of images could be connected with a text data block or an audio data block. As already mentioned with respect to FIG. 1, such assignments are also possible with respect to application programs.

The connection between the data block TB1 and said storage means S1 schematically illustrates, that data block TB1 is currently displayed on said display means AV1 of the data processing device DV1. On the display, the data segments DS11–DS1n of said data block TB1 are shown. According to the invention, controlled by the input means EV1, a selection of a data segment of data block TBF displayed on said display means AV1 can initiate a display or reproduction of data according to the assignments specified in the assignment data block. For example, the selection of data segment DS12, according to the assignment specified in the assignment data block Z, would initiate the display of data segment DS21 of data block TB2. Accordingly, a selection of the data segment DS16 on the display means AV1 would cause the reproduction of audio data segment AS11 of audio data block A1. It is possible to display simultaneously several data blocks or data segments on the display means AV1.

Figure 3:
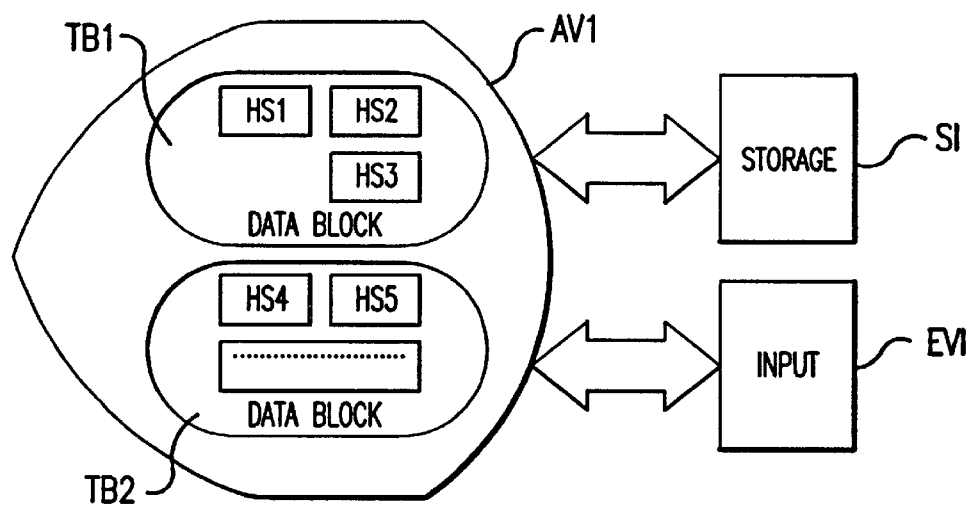
FIG. 3 illustrates an embodiment of a display means of a data processing means showing data segments, optically marked according to assignment instructions.

FIG. 3 illustrates a selection and display of data segments according to assignment instructions of the assignment data block Z in detail. FIG. 3 schematically shows display means AV1, e.g. a screen, which in the example is divided into sections for displaying text or an image. Said display means AV1 is connected with said storage means S1 and input means EV1, marked by double arrows. Not shown in FIG. 3 are central processing means, controlling the communication between display means, storage means and input means. Controlled by the central processing means, those data segments are optically marked, which, according to the assignment data block Z, are linked to another data segment or data block. The optical marks can, for example, be provided via marks of color, brightness or the like.

Controlled by the input means, it is possible to select one of th e marked areas, so called "hotspots", e.g., using a cursor and mouse button usually provided with data processing devices, and to therewith cause the display or reproduction of the data section or data block linked with the "hotspot".

FIG. 3 schematically shows "hotspots" HS1 to HS5. Hotspots can be data segments or data blocks, and thus can be segments of a text document, e.g., a word or a character or a plurality of words or can be parts of an image or a sequence of images. Thus, for example, by selecting a section of an image or a sequence of images marked as a hotspot, another data block or data section, according to the assignment data block, could be displayed. If the data block or data section or a part thereof displayed following to the selection of a hotspot itself is again connected to further data blocks or data segments, these are marked as hotspots and can be selected via input means.

For example, hotspot HS1 could correspond to data segment DS11 and hotspot HS2 could correspond to data segment DS15 from FIG. 2. Thus, with the selection of hotspot HS1, according to the assignment data block Z, data segment DS16 would be displayed on the display means and, with the selection of hotspot HS2, according to the assignment data block Z, audio data block A1 would be reproduced by said play back means.

Preferably, on the display, only data blocks or data segments are marked as hotspots, which are at the first location in an assignment of the assignment data block. In case of the assignment pair DS11 and DS16 data segment DS11 would be marked as a hotspot. However, other embodiments are possible, where, possibly in a different manner, several or all data blocks or data segments of an assignment will be marked as hotspots in case of being displayed. It is also possible that the assignment data block includes an assignment of an image sequence or parts of an image sequence and text blocks, which, e.g., could be used to display the text data blocks as subtitles within the image sequence.

In other embodiments of the invention, an audio data block or audio data segment may be marked as a hotspot, for example via a faded in tone signal or via a change of the pitch.

Figure 4:
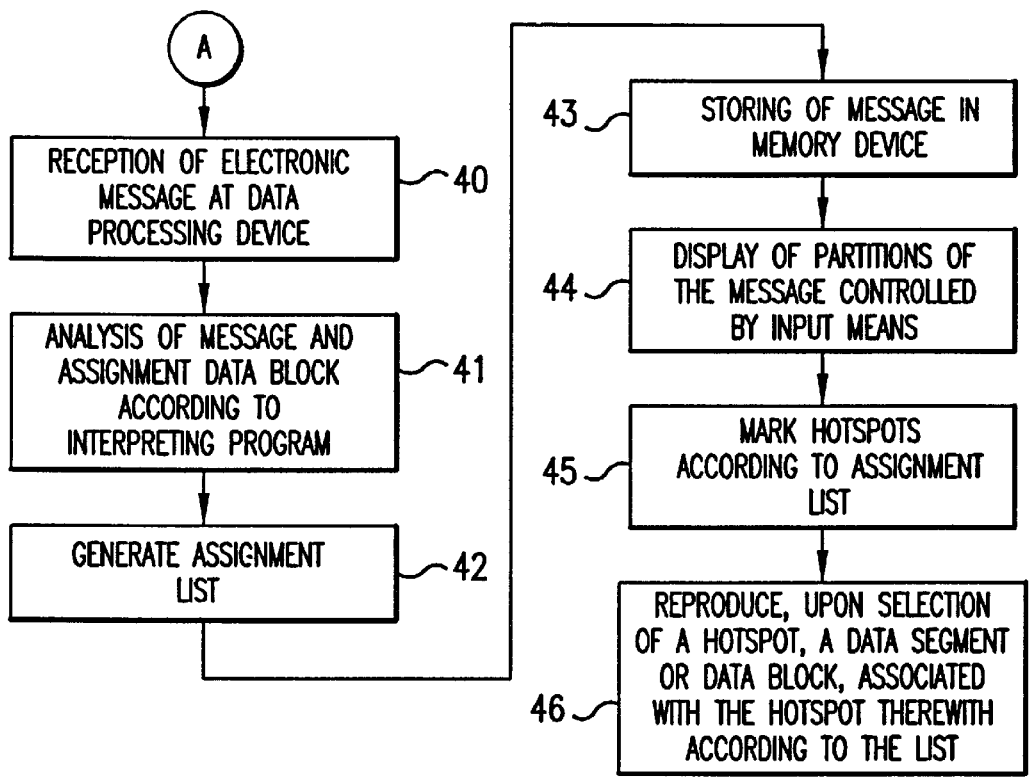
FIG. 4 illustrates a flow chart of the reception and processing of an electronic message.

FIG. 4 shows a flow chart, illustrating reception and processing of an electronic message by a data processing device of the communication system according to the invention. The flow starts at an entry point A. A block 40 indicates that a data processing device, which is recipient of an electronic message, receives the message from the network. Prior to that, the message was sent from a sending data processing device by specifying a recipient address, as already described with respect to the prior art. A block 41 indicates that in a next step the received message is analyzed including the assignment data block by the central processing means according to a specific processing program. The message is parsed in particular data segments or data blocks using the previously described indicator data sequences. With the analysis of the assignment data block, as indicated by a block 42, an assignment list can be generated by the central processing means, which specifies the links between the data blocks and data segments. A block 43 indicates that the particular data blocks of the message and the assignment list are stored in the storage means S. The assignment list can advantageously be defined such that it specifies links between segments of the storage means. A block 44 controlled by the input means, e.g., keyboard or mouse, as common with data processing devices, indicates parts of a message and data blocks or data segments that are displayed on the display means or reproduced via play back means. Segments of the displayed part of the message connected with other data blocks or data segments according to the assignment data block can, as indicated by block 45, be marked as the previously described hotspots. Further, a block 46 indicates that, upon selection of a particular hotspot, data blocks or data segments linked to the corresponding data segment can be displayed or played back according to the assignments of the list. This may, as described previously, include a display on said display means or include a reproduction via play back means or may include the execution of certain operating sequences of the central processing means according to an application program. Upon display of data segment linked to a hotspot, it is possible, in correspondence with the above, that in the now displayed data block, further hotspots are marked, specifying further links, which can be selected in further steps via the input means.

The sequence of steps of FIG. 4 is an explanatory illustration. The sequence of steps can be altered, e.g. steps with respect to storing the electronic message, and particular steps can be altered, e.g. the processing of the assignment data block.

Therefore, the above-described embodiments should be regarded as illustrative rather than restrictive, and it should be appreciated that variations may be made in those embodiments by workers skilled in the art without departing from the scope of the present invention as defined by the following claims.

What is claimed is:

1. A communication system for electronic messages, comprising:
    a plurality of data processing devices, each data processing device comprising a central processing means, storage means, input means and display means;
    a data network for data transmission of electronic messages, controlled by the central processing means of a first data processing device, to a second data processing device;
    wherein
        an electronic message includes data blocks;
        the central processing means of the second data processing device analyzes the electronic message and stores the data blocks, included in the electronic message, in the storage means and displays or reproduces the data blocks, as controlled by the input means;
        an assignment data block is included with the transmission of the electronic message, including at least one assignment instruction specifying an assignment between a first data block or data segment and at least one second data block or data segment of the electronic message;
        the central processing means, of the second of data processing device, parses the electronic message into respective data blocks using indicator data sequences, and stores said data blocks in respective storage means; and
        the central processing means, of the second of data processing device, analyzes said assignment data block and, based on the analysis, generates a list of assignments between storage locations in which data blocks or data segments of the electronic message are stored.

2. The communication system according to claim 1, wherein the electronic message includes at least one of the group consisting of at least one text data block, at least one image data block, and at least one audio data block.

3. The communication system according to claim 2, wherein the assignment data comprises and assignment between a data segment or data block and said application program.

4. The communication system according to claim 2, wherein the central processing means are arranged to mark data segments or data blocks displayed on the respective display means which are linked with other data segments or data blocks.

5. The communication system according to claim 2, wherein the central processing means are arranged to mark audio data segments or audio data blocks, reproduced by respective play back means, which are linked with other data segments or data blocks by means of a tone signal, a change of pitch or other audible signal.

6. The communication system according to claim 5, wherein the central processing means are arranged to display assigned data segments or data blocks on the display means and/or reproduce said data via the play back means upon selection of a marked data segment or data block, controlled by the respective input means and according to the assignments of the generated assignment.

7. The communication system according to claim 2, wherein image data blocks consist of image sequences.

8. The communication system according to claim 1, wherein the electronic message includes at least one data block comprising an application program.

9. The communication system according to claim 1, wherein the central processing means can process electronic messages according to the MIME (Multipurpose Internet Mail Extensions) standard together with the SMTP (Simple Mail Transfer Protocol) or according to another known standard.

10. The communication system according to claim 1, wherein the electronic message, with exception of the assignment data block, corresponds to the MIME or X.420 or to another known standard for electronic messages.

* * * * *